Figure 9:
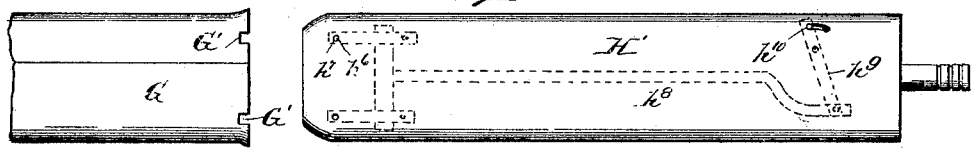

No. 622,741. Patented Apr. 11, 1899.
F. A. WELLER.
MACHINE FOR TURNING AND CUTTING TUBULAR FABRIC.
(Application filed Jan. 21, 1899.)
(No Model.) 6 Sheets—Sheet 1.
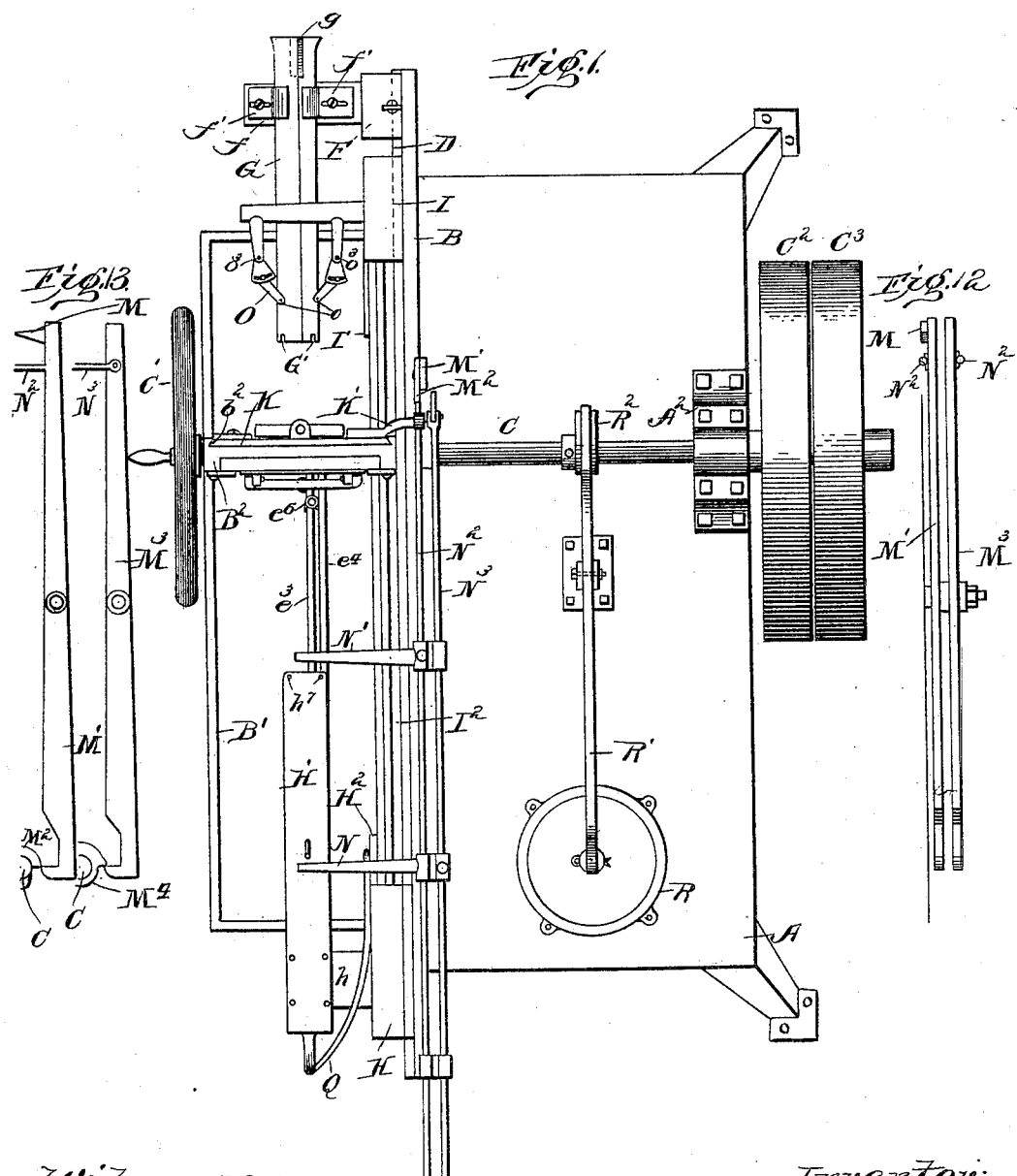
Witnesses:
J. M. Fowler Jr.
Alexander Stuart
Inventor:
Franklin A. Weller
by Church & Church
his Attorneys No. 622,741. Patented Apr. 11, 1899.
F. A. WELLER.
MACHINE FOR TURNING AND CUTTING TUBULAR FABRIC.
(Application filed Jan. 21, 1899.)
(No Model.) 6 Sheets—Sheet 2.
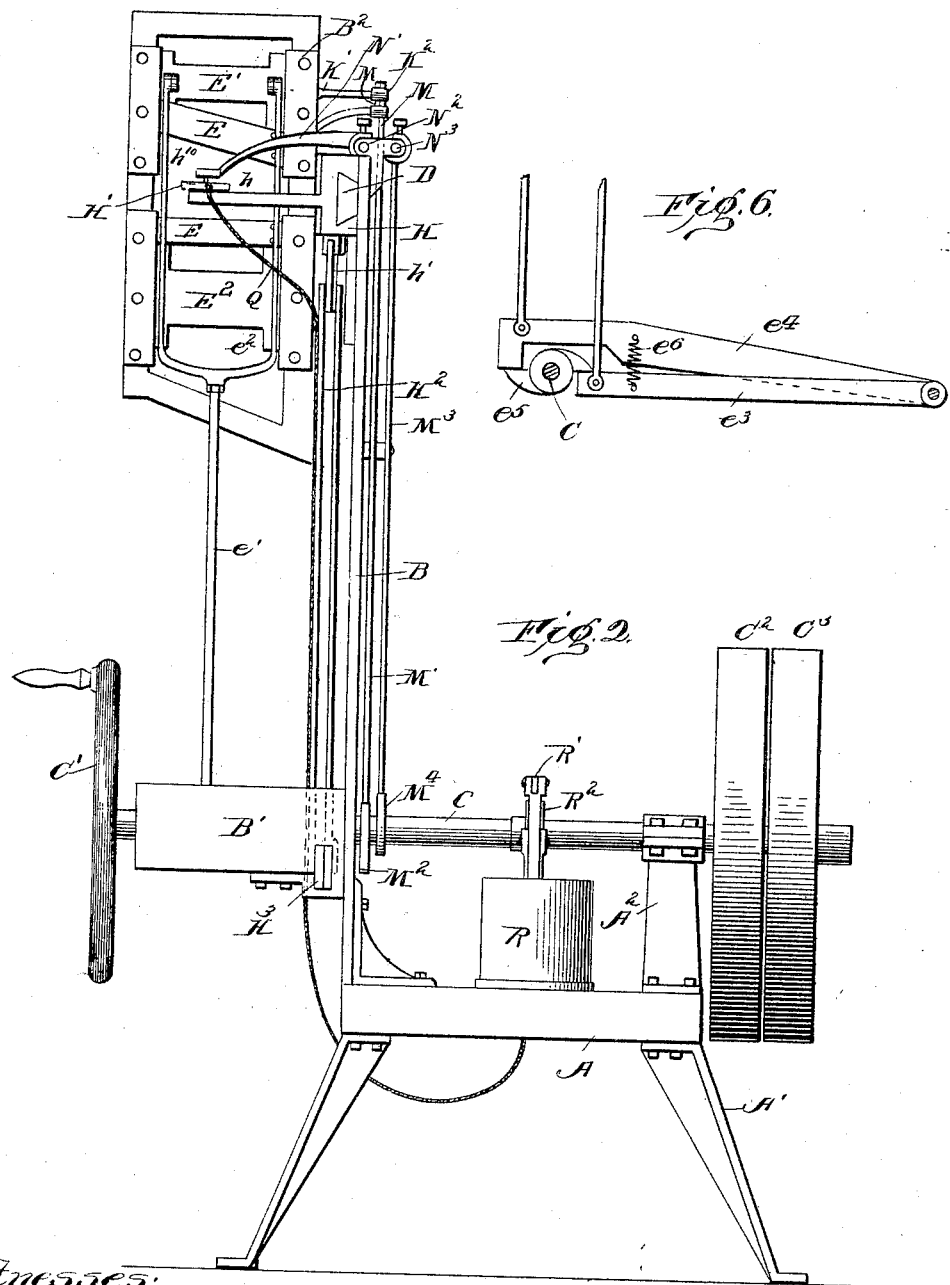

No. 622,741. Patented Apr. 11, 1899.
F. A. WELLER.
MACHINE FOR TURNING AND CUTTING TUBULAR FABRIC.
(Application filed Jan. 21, 1899.)
(No Model.) 6 Sheets—Sheet 3.
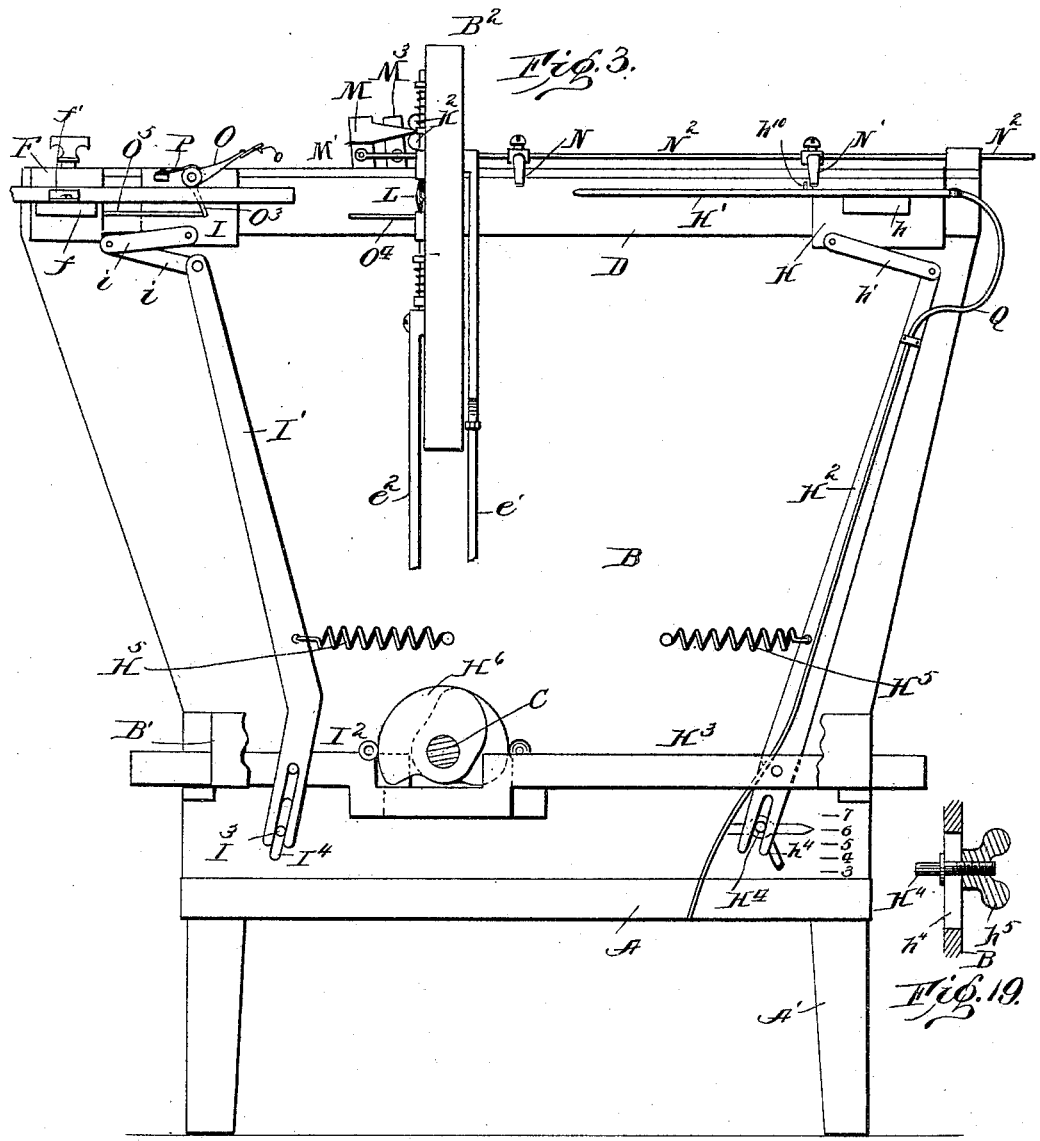

No. 622,741. Patented Apr. 11, 1899.
F. A. WELLER.
MACHINE FOR TURNING AND CUTTING TUBULAR FABRIC.
(Application filed Jan. 21, 1899.)
(No Model.) 6 Sheets—Sheet 4.
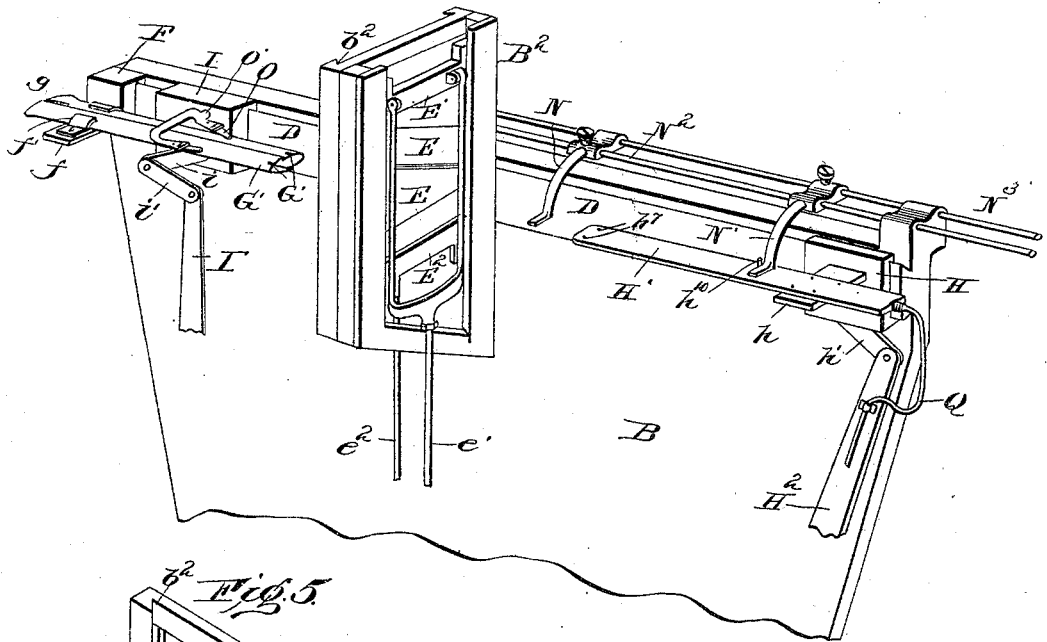
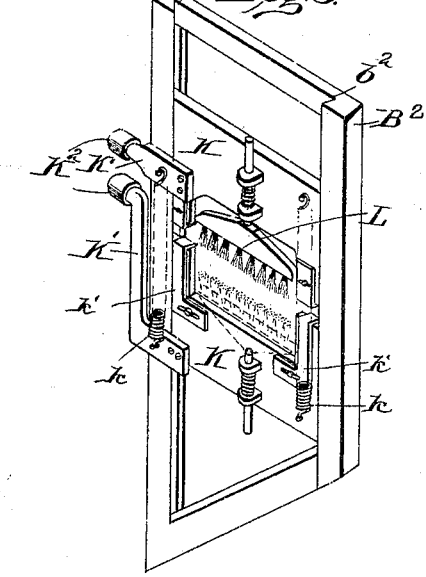
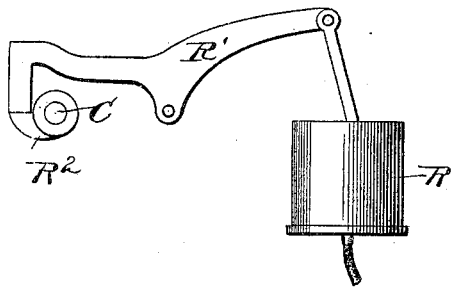
Witnesses:
J. M. Fowler Jr.
Alexander Stewart
Inventor
Franklin A. Weller
by Clunch & Clunch
his Attorneys No. 622,741. Patented Apr. 11, 1899.
F. A. WELLER.
MACHINE FOR TURNING AND CUTTING TUBULAR FABRIC.
(Application filed Jan. 21, 1899.)
(No Model.) 6 Sheets—Sheet 5.

Witnesses
J. M. Fowler Jr.
Alexander J. Stuart

Inventor:
Franklin A. Weller,
by Church & Church
his Attorneys.

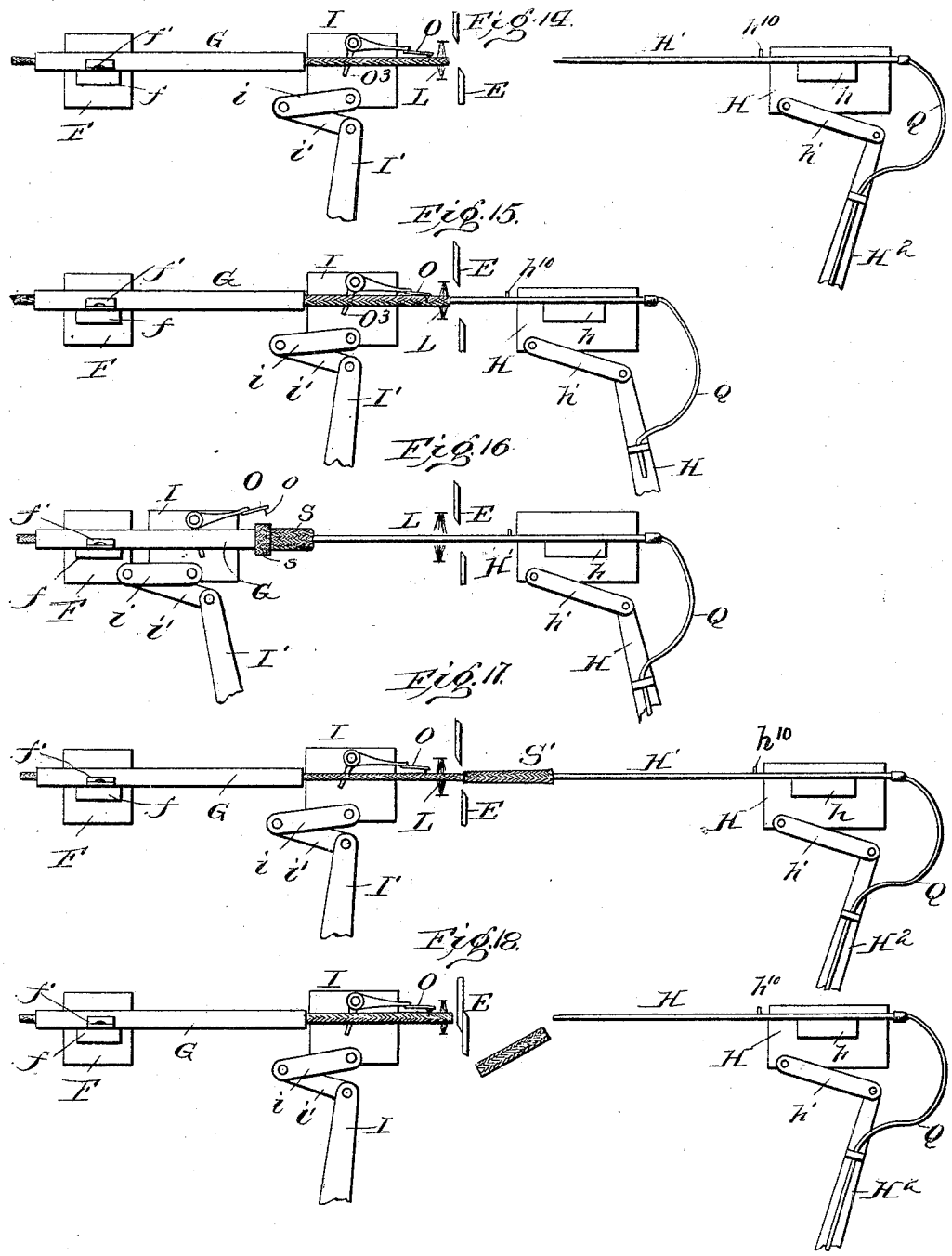

UNITED STATES PATENT OFFICE.

FRANKLIN A. WELLER, OF PHILMONT, NEW YORK, ASSIGNOR OF ONE-HALF TO JOHN HISTON, OF SAME PLACE.

MACHINE FOR TURNING AND CUTTING TUBULAR FABRIC.

SPECIFICATION forming part of Letters Patent No. 622,741, dated April 11, 1899.

Application filed January 21, 1899. Serial No. 702,971. (No model.)

*To all whom it may concern:*

Be it known that I, FRANKLIN A. WELLER, a citizen of the United States, residing at Philmont, in the county of Columbia and State of New York, have invented certain new and useful Improvements in Machines for Turning Tubular Fabric and Cutting the Same into Predetermined Lengths; and I do hereby declare the following to be a full, clear, and exact description of the same, reference being had to the accompanying drawings, forming a part of this specification, and to the letters of reference marked thereon.

This invention has for its object to provide a machine for automatically turning lengths of tubular fabric and severing such turned lengths for subsequent manipulation or use—such, for instance, as the formation of wristbands and ankle-bands for personal underwear; and it consists, primarily, in a machine which, taking the fabric in the continuous lengths as delivered from the knitting-machine or other machine for forming the same, will turn the end back upon itself a predetermined distance, forming a double-walled tube, so to speak, and then sever such turned end from the body of the tube, forming a complete wristband or ankle-band ready for attachment to the garment.

In the adaptation of the invention illustrated in the accompanying drawings the mechanism will first draw the tubular fabric through a guide, then by means of a ram or plunger bind the goods against the walls of the tubular guide and roll or draw that portion of the tube forward of the end of the tubular guide back over the tubular guide, and finally draw the double portion together with the body of the tubular fabric forward into position for the operation of severing-knives for dividing the web at the desired point.

Figure 10:
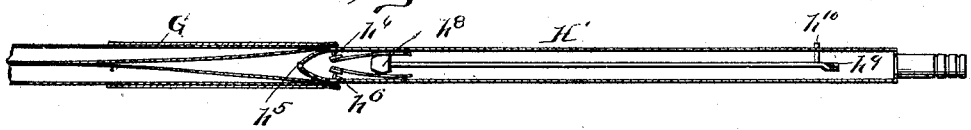
Figure 8:
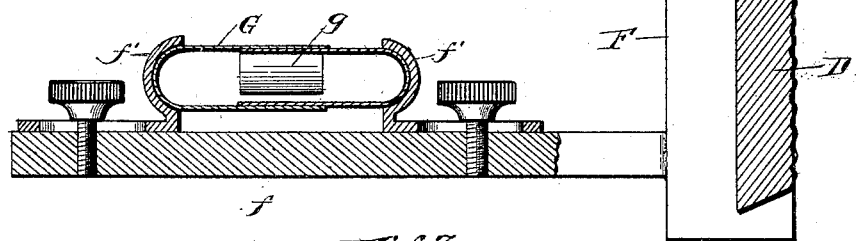
Figure 7:
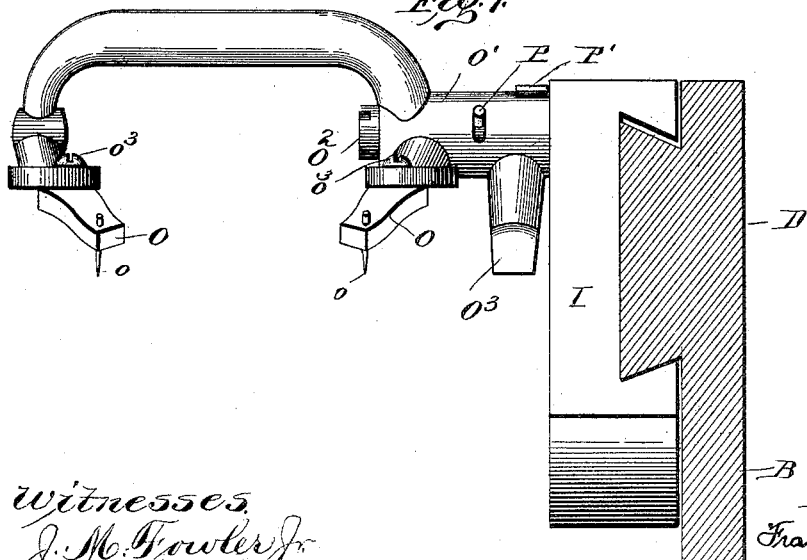

Referring to the accompanying drawings, Figure 1 is a top plan view of a machine embodying my present improvement. Fig. 2 is an end elevation of the same. Fig. 3 is a side elevation with portions broken away to show underlying parts. Fig. 4 is a perspective view of the upper portion of the machine alone. Fig. 5 is a perspective view of the presser-feet and brushes for holding the fabric and completing the turning operation. Fig. 6 is a detail of the knife-operating levers and cam. Fig. 7 is an elevation of the turning block and fingers. Fig. 8 is a sectional view of the tubular guide through which the web is drawn. Fig. 9 is a top plan view of one end of the tubular guide and the ram or blade which enters the fabric issuing therefrom. Fig. 10 is a sectional view through the ram and end of the tubular guide shown in Fig. 9. Fig. 11 is a detail elevation of the air-pump for supplying air-pressure to the ram or blade for opening the end of the tubular fabric for the entrance of the ram or blade. Figs. 12 and 13 are vertical elevations of the levers for manipulating the presser-feet and brushes and for operating the gripping-pins carried by the ram or blade. Figs. 14, 15, 16, 17, and 18 are diagrammatic views illustrating the operation of the machine in turning a section of fabric and severing the same. Fig. 19 is a detail of one of the adjustable fulcrums for one of the operating-levers.

Like letters of reference in the several figures indicate the same parts.

The frame of the machine consists of a bedplate A and vertical side plates B, is preferably mounted upon short legs A', and adapted to support all of the working parts of the machine. On one side of the bed-plate A a bearing $A^2$ is mounted, and at the opposite side of the vertical plate or frame B a skeleton frame B' is extended and provided with a bearing arranged in line with the bearing $A^2$ and adapted to support the main or drive shaft C, one end of which may be provided with a hand-wheel C' and the opposite end with fast and loose pulleys $C^2 C^3$, to which any suitable power may be belted for driving the machine.

Along the upper edge of the plate B (see Figs. 1 to 4 and 7 and 8) there is formed a track or way D, upon which the main operating or moving parts of the machine are adapted to travel toward and from each other from a central point. At this central point a vertical transversely-arranged frame $B^2$ is rigidly connected with the frame B and provided with vertical ways, in which slide the oppositely-moving severing-knives E, which knives are arranged, preferably, one horizontally and the other at an inclination in order to make a drawing cut through the fabric, leaving no uncut threads or attaching portions. These severing-knives are mounted in frames E' E² and are operated by means of rods or links $e'$ $e^2$, extending down and connected at their lower ends to the ends of pivoted levers $e^3$ $e^4$. The levers are adapted to be moved simultaneously in opposite directions to close the knives by cams $e^5$ on the main shaft C. Thus when the shaft is rotated at the proper intervals the knives will be advanced toward each other and anything lying between them will be severed, the return movement of the knives being effected by a spring or springs, such as $e^6$, Fig. 6, although other well-known means for securing a reverse movement may be provided.

At one end the track or way D supports an adjustable block F, which block F in turn carries a bracket $f$, having upon its upper surface two adjustable clamps $f'$, (see Fig. 8,) adapted to support longitudinal sections of the tubular guide G, through which the fabric to be turned is drawn. By making this guide G in longitudinal sections the two sections may be adjusted toward and from each other to accommodate fabrics of different widths, and by making the block and bracket supporting the tubular guide adjustable on the track D the guide may be adjusted to any position for adapting the machine for turning sections of greater or less length. In order to prevent the fabric from passing through the tubular guide too freely, a spring-tension $g$ may be formed by bending inwardly a portion of the rear end of one of the sections, so as to press the fabric against the bottom of the guide, as will be readily understood. At the opposite end of the machine the track D carries a longitudinally-movable block H, which block H in turn carries a bracket $h$, and to the latter is fixed the relatively long blade or ram H' for entering, supporting, and advancing the fabric, as will be presently explained. The block H is connected by a link $h'$ with the upper end of a lever H², which lever is pivotally connected near its lower end with a longitudinally-sliding bar H³, and at its extreme lower end it is bifurcated or slotted for the reception of a stud H⁴, around which it is adapted to pivot, and which stud in turn is made adjustable vertically in a slot $h^4$ by means of a thumb-nut $h^5$, in order to vary the throw of the lever at the upper end. The bar H³ is held normally at one extreme of its movement by a spring H⁵, and is adapted to be moved in the opposite direction in order to advance the ram or blade by means of a cam H⁶, carried by the main drive-shaft C and coöperating with a stud or projection on the side of the bar. At the opposite end of the track or way D and between the block F and the frame B² there is arranged a block I, corresponding to the block H and adapted to carry a pair of turning fingers or arms to be presently explained. This block I is connected through links $i$ $i'$ with the upper end of a lever I', which lever I' is pivoted to a bar I², corresponding and working parallel with the bar H³, its movement being secured by the cam I⁹ and I¹⁰. The lever I' is also slotted at its lower end and adapted for the reception of an adjustable stud I³, corresponding to the stud H⁴, and also adjustable vertically to vary the throw of the upper end of the lever. Inasmuch as the block I, as will hereinafter appear, must always advance to the same point the slot I⁴, in which the stud I³ is adjustable, extends in a line which if projected would intersect the point of farthest advance of the block, and thus, regardless of the position of adjustment of the stud I³ and of the throw of the lever rearwardly, the block will always advance to and stop at a given point.

On the left-hand side of the transversely-arranged frame B² there are formed vertical ways $b^2$, in which two plates K are adapted to move toward and from each other and to be drawn together by springs $k$. These plates work toward and from the line of the tubular fabric extending between the ram or blade H' and the tubular guide G, and at opposite sides they are provided with projections forming the presser-feet, such presser-feet being preferably adjustable plates $k'$, Fig. 5, made adjustable to accommodate different widths of tubular fabric. In addition these plates K carry intermediate the presser-feet spring-pressed brushes L, the function of which will hereinafter appear in the description of the operation of the machine. The two plates K are provided with laterally-projecting arms K', carrying antifriction-rollers K² at the ends. These rollers are in position to be separated by a wedge M, mounted on the upper end of a lever M', journaled on the side of the plate or frame B and adapted to be reciprocated by means of a cam M² on the main operating-shaft C. The reciprocation of the lever M' at predetermined intervals will open or permit the blades K to close, thus gripping or releasing the edges of the tubular fabric passing between them.

Referring more particularly now to Figs. 9 and 10, it will be seen that the ram or blade H' is made hollow and is bluntly pointed at its forward end, which forward end is provided with a relatively small aperture $h^5$. The end of said ram or blade is also provided with pins $h^6$, adapted to be projected through transverse apertures $h^7$ by means of a wedge or incline $h^8$ working longitudinally within the ram and adapted itself to be moved positively in one direction or the other by means of a lever $h^9$ and a pin $h^{10}$, projecting out through the top of the ram. This pin $h^{10}$ lies in position to be operated by an arm or projection N, carried by a rod N², and the rod N² is connected with the lever M'. Thus when said lever is advanced to open the presser-feet and brushes the pins $h^6$ will be forced outwardly and will penetrate the goods which surround the ram or blade. The pins $h^6$ having been once projected will remain projected until the operating-pin $h^{10}$ is moved in the doubled edge of the fabric. The lever H² and ram or blade move back, and as the penetrating pins or points of the ram or blade are in engagement with the doubled edge of the fabric the fabric will be drawn forwardly to the position shown in Fig. 17 at S'. As the ram moves back the brushes L sweep along over the smooth surface of the ram until the fabric is encountered, when as the fabric is drawn through them it will be smoothed down and the extremity s, Fig. 16, turned completely down upon the body of the fabric. The movement of the ram or blade is so proportioned that when at its extremity of movement in this direction the edge of the fabric will be approximately in position for the cutting-knives E E to sever the fabric immediately adjacent to said edge, the position being well illustrated in Fig. 17, and when in this position, or just as it reaches this position, the presser-feet are released from the action of the wedge M, and the feet are caused to grip the edge of the fabric. Meanwhile the block I is advanced, and at the instant when the severing takes place the turning arms and pins are dropped into position to engage the edge of the fabric and prevent it from escaping, the parts being then ready for a subsequent manipulation. The cutting-knives E E sever the fabric practically just at the instant that the ram or blade reaches its normal position and just at the instant that the stop or arm N' engages the pin $h^{10}$ and retracts the holding-pins $h^6$ in the end of the ram, the result being that as the doubled length of tubular fabric is severed from the body of the web or fabric it is entirely released from the machine and drops down out of the way or may be carried off by a chute, or other means may be provided for disposing of it. The cutting-knives now separate, and the machine is ready for a subsequent operation, the parts being then in position illustrated in Fig. 14.

Having thus described my invention, what I claim as new, and desire to secure by Letters Patent of the United States of America, is—

1. In a machine for turning tubular fabric, the combination with a guide through which the tubular fabric is drawn, of reciprocatory turning-arms coöperating with the edge of said fabric to draw the same over the outer side of the guide, and means independent of said turning-arms for drawing the turned section away from the guide; substantially as described.

2. In a machine for turning tubular fabric, the combination with a guide through which the tubular fabric is drawn, of a ram for binding the said fabric in the mouth of the guide and reciprocatory turning-arms for drawing the end of the fabric back over the guide; substantially as described.

3. In a machine for turning tubular fabric, the combination with a tubular guide, and a ram or blade working toward and from the mouth of said guide and entering and binding the tubular fabric in the mouth of the guide, of reciprocatory turning-arms coöperating with the fabric for drawing the same back over the end of the guide and means for connecting the ram and turned fabric for advancing the turned end beyond the mouth of the guide; substantially as described.

4. In a machine for turning tubular fabric, the combination with a guide through which the fabric is drawn, and reciprocatory turning-arms for drawing the end of the fabric back over the guide, of a reciprocatory ram or blade having engaging pins thereon, and working toward and from the guide for advancing the turned end of the fabric; substantially as described.

5. In a machine for turning tubular fabric, the combination with a tubular guide, and a ram or blade having a conical end reciprocating toward and from the mouth of said guide, of reciprocatory turning-arms working from front to rear of the mouth of said guide for drawing the tubular fabric back over said mouth and wipers through which the turned section of fabric is passed; substantially as described.

6. In a machine for turning tubular fabric, the combination with a tubular guide through which the fabric is passed, presser-feet for holding said tubular fabric forward of the mouth of the guide, a ram or blade working through said presser-feet and into the mouth of the guide for binding the fabric therein, and reciprocatory turning-arms working from front to rear of said mouth for drawing the end of the fabric back over the mouth, and means for connecting the ram and turned fabric for advancing the turned end of the fabric; substantially as described.

7. In a machine for turning tubular fabric, the combination with a tubular guide, and a reciprocatory ram or blade working toward and from the mouth of said guide, of presser-feet arranged on opposite sides of said blade, the wiping-brushes through which the blade reciprocates, engaging pins on the end of said blade for advancing the fabric, and turning-arms reciprocating from front to rear of the mouth of the guide for turning the end of the fabric back over said mouth; substantially as described.

8. In a machine for turning tubular fabric, the combination with fabric supporting and turning devices, of a blade or ram with means for reciprocating the same into the mouth of the tubular fabric, and holding or gripping points in the end of said blade or ram for coöperating with the fabric and gripping it at a point removed from the edge of the fabric; substantially as described.

9. In a machine for turning tubular fabric, and severing the same into sections of predetermined length, the combination with a pair of severing-knives and a guide through which the fabric is drawn, of a reciprocatory blade or ram working through between said knives, opposite direction, and this is accomplished by means of an arm or stop N', carried by a rod N³, lying parallel with the rod N², and connected with the upper end of a lever M³. The lever M³ is operated by means of a cam M⁴ on the main drive-shaft C, as illustrated in Figs. 12, 13, and 2. To accommodate the pins $h^6$ when the end of the ram has been forced into the end of the guide G, the end of said guide G is slotted or notched at G', Fig. 9. Thus the pins may be projected when the ram has wedged the tubular fabric in the mouth of the guide to prevent movement of the fabric in either direction. For the purpose of stripping the tubular fabric back and over the end of the tubular guide after it has been thus gripped by the ram or blade in the mouth of the tubular guide the block I, Figs. 4 and 7, is provided with pivoted "turning-arms" O, having pins $o$ in their ends and preferably carried by a base O', mounted on a stud-axle O², secured in the block I. The base for the turning-arms is limited in its rocking movement by means of a pin P, and it is held in either position of adjustment by means of a spring P' bearing upon its upper surface, and it is moved or rocked so as to raise or lower the turning-arms O by means of a downwardly-extending projection O³, which is adapted to contact with a fixed stop or pin O⁴ at the forward extreme of its movement and with a stop or pin O⁵ at its rearward extreme of movement, the said pin O⁵ being carried by and adjustable with the block F. With this arrangement it will be seen that when the block I is advanced through the mechanism heretofore described the turning-arms O will be depressed and the pins $o$ will be caused to penetrate the edges of the tubular fabric, and when the block O is returned the arms, remaining depressed, will draw the fabric back over the edge of the guide, and as the said block I reaches the rearward extreme of its movement the pin O⁵, contacting with the projection O³, will elevate the turning-arms and release the fabric, so that it may be drawn forward by the ram or blade. Provision has been made for adjusting the various parts of the machine to accommodate fabric of different widths and carrying out this idea. The arms O are also adjustable toward and from each other, being preferably held to the base O' in adjusted position by means of screws $o^3$, Fig. 7.

In the manipulation of the machine, to be hereinafter described, the tubular fabric after a turned length has been severed therefrom is held by the presser-feet and brushes, and as the ram advances to enter the same it is desirable that the lips or edges of the cut end should be open, and in order to accomplish this air-pressure is supplied to the interior of the ram or blade, and the blast issuing from the aperture $h^5$ will separate the cut edges of the tubular fabric and permit the ram to enter. This air-pressure is supplied through a flexible pipe Q, extending from the rear end of the ram down the lever H² and communicating with an air-pump or dash-pot R, situated on the base-plate of the machine. The piston within the dash-pot or pump is operated by means of a lever R' and a cam R² on the main drive-shaft C, such cam being preferably timed to cause an air-pressure or blast to be forced through the ram or blade just as the same advances to a point in front of the end of the fabric held by the presser-feet and brushes.

From the foregoing the mechanical construction and means for securing the movements of the several parts will be readily understood, and it remains only to describe the operation of the machine in handling the tubular fabric, and in order to more graphically illustrate the operation of the machine I have shown diagrammatically in Figs. 14 to 18 the several positions assumed in drawing forward, turning, and severing the end of the tubular fabric in order to form a wristband or ankle-band to be applied to the undergarment and with a doubled edge at the wearing-point. Assuming that the tubular fabric has been drawn through the guide G by hand and that the block I is in its advanced position, the fabric is placed between the presser-feet and brushes L, and its edges are penetrated by the turning-points $o$ on the arms O. In this position the parts will be as represented in Fig. 14, and the machine is ready to commence its automatic operation. The first portion of the movement of the driving-shaft will be to cause the ram or blade H' to advance, and as it approaches the end of the tubular fabric the pump R will force a blast of air through the orifice $h^5$, opening the end of the tubular fabric, so that as the blade or ram advances it will enter therein, and, being smooth on the exterior, will pass along within the tubular fabric until it wedges in the mouth of the guide G, as shown in Fig. 15. This having been done and the fabric fixed at the mouth of the guide, the presser-feet and the brushes are opened by the advance of the wedge M a sufficient distance to accomplish this, but not a sufficient distance to project the pins or points in the end of the ram. The next movement is caused by the cam-operating lever I' and block I to move the same from the position illustrated in Figs. 14 and 15 to that illustrated in Fig. 16, the turning arms and points meanwhile remaining down and in engagement with the tubular fabric, drawing the end of said fabric backwardly and causing it to double back over the end of the tubular guide, as shown at S in said Fig. 16, leaving, however, the extreme end of the fabric doubled over in a forwardly direction, as shown at $s$ in said Fig. 16. As the block I reaches its rearward position the pin O⁵ strikes the projection O³ and raises the turning arms and pins, disengaging them from the fabric. At this time the advance of the lever-carrying wedge M causes the pins then in the end of the ram to project, penetrating the grippers on said ram, for engaging the tubular fabric from the interior and stripping or turning mechanism for drawing the edge or end of said fabric back over the end of the guide; substantially as described.

10. In a machine for turning tubular fabric, and severing the same into sections of predetermined length, the combination with a tubular guide through which the fabric is drawn, a pair of severing-knives and a ram or blade reciprocating between said knives, of a pair of turning-arms with means for reciprocating said arms from front to rear of the end of the guide for turning the fabric, grippers in the end of said ram or blade for advancing the fabric, and wipers through which the fabric is drawn to smooth the turned end and complete the turning operation; substantially as described.

11. In a machine such as described, the combination with the severing-knives and presser-feet, of the oppositely-arranged reciprocatory blocks, the levers for reciprocating said blocks, the tubular guide, and the ram or blade and turning-arms mounted on said blocks, respectively; substantially as described.

12. In a machine such as described, the combination with the severing-blades, the presser-feet with means for opening and closing said blades and presser-feet respectively, and the tubular guide, of the oppositely-arranged reciprocatory blocks, levers for reciprocating said blocks, the ram or blade mounted on one of said blocks, the pivoted turning-arms mounted on the other of said blocks and fixed stops for moving said arms into or out of operative position; substantially as described.

13. In a machine such as described, the combination with the vertically-working severing-blades and presser-feet, with means for operating the same and the tubular guide, of the ram or blade, reciprocatory blocks for carrying the same, driving mechanism for reciprocating said blocks, the pivoted turning-arms, the reciprocating block on which said arms are mounted, the lever for reciprocating said block, the fixed stops for moving the turning-arms into or out of operative position and means for holding said arms in their relative positions of adjustment; substantially as described.

14. In a machine for turning tubular fabric, the combination with the ram or blade for binding and advancing the fabric, and the turning-arms with means for reciprocating said ram or blade and turning-arms, of a tubular guide through which the fabric is drawn and a spring tension for retarding the passage of the fabric through said tubular guide; substantially as described.

15. In a machine for turning tubular fabric, the combination with the reciprocatory ram or blade and reciprocatory turning-arms, of the tubular guide through which the fabric is drawn made in longitudinal sections, with means for adjusting said sections to accommodate fabric of different widths; substantially as described.

16. In a machine for turning tubular fabric, the combination with the reciprocatory ram or blade and reciprocatory laterally-adjustable turning-arms, of the tubular guide through which the fabric is drawn made in longitudinal sections, with means for adjusting said sections to accommodate fabric of different widths; substantially as described.

17. In a machine such as described for turning tubular fabric, the combination with a fixed tubular guide through which the fabric is drawn, and reciprocatory turning-arms, of a reciprocatory ram or blade working toward and from the mouth of said guide, transversely-arranged gripping-pins carried by said blade, an operating projection for said pins and stops interposed in the path of travel of the projection for causing the pins to be projected and retracted; substantially as described.

18. In a machine for turning tubular fabric, the combination with the tubular guide through which the fabric is drawn, and the reciprocatory turning-arms for drawing the end of the fabric back over the mouth of said guide, of the reciprocatory ram or blade working toward and from the mouth of said guide, a jet-orifice in the end of said ram or blade and means for supplying air-pressure thereto for opening the edge of the tubular fabric for the entry of the ram or blade; substantially as described.

19. In a machine such as described, the combination with the tubular guide, the reciprocatory turning-arms and reciprocatory ram or blade, of the presser-feet, the laterally-extending arms controlling said presser-feet, the wedge for operating said arms to open the presser-feet and the lever controlling said wedge; substantially as described.

20. In a machine such as described, the combination with the tubular guide through which the web is drawn, the reciprocatory turning-arms for drawing the edge of the web back over the mouth of the guide and the severing-blades, of the reciprocatory ram or blade, the gripping-pins in said ram or blade for engaging the web, the movable stops controlling the projection and retraction of said pins and the levers controlling said stops; substantially as described.

21. In a machine such as described, the combination with the tubular guide through which the fabric is drawn, the reciprocatory turning-arms and the reciprocatory ram or blade having the gripping-points for engaging the web, of the spring-pressed brushes between which the ram is reciprocated, the presser-feet, and means for opening and closing said presser-feet; substantially as described.

FRANKLIN A. WELLER.

Witnesses:
EMMA WALTERMIRE,
ANNIE VAN NESS BLANCHET.